Feb. 8, 1927.
W. H. NASH
1,616,463
HAULING ATTACHMENT FOR FORDSON TRACTORS
Filed Jan. 4, 1926
2 Sheets-Sheet 1
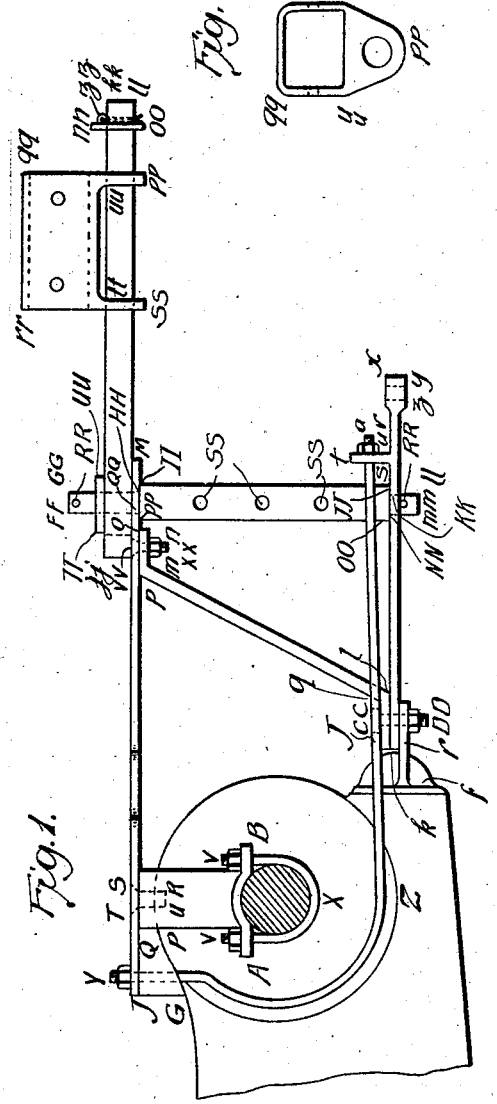
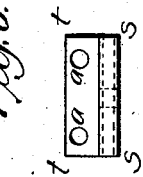
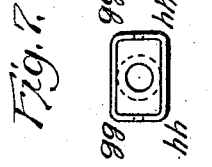
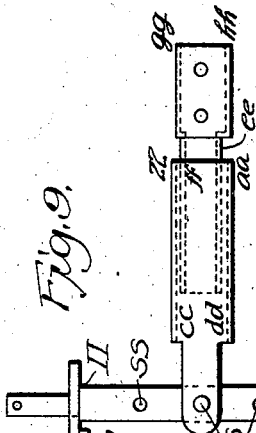
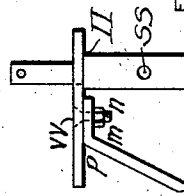
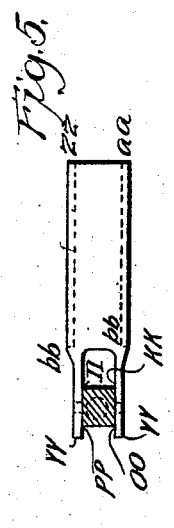
Inventor
William Henry Nash

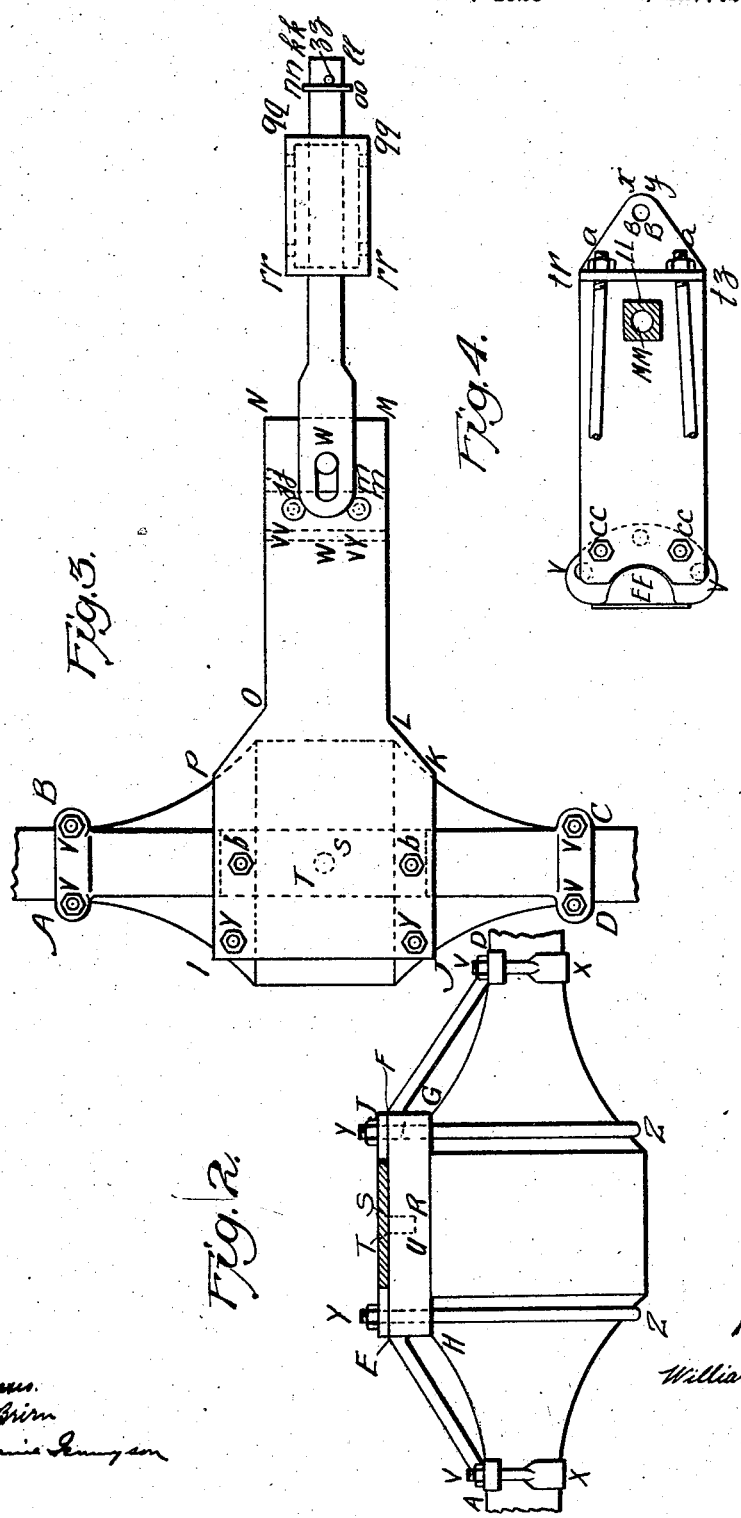

Patented Feb. 8, 1927.

1,616,463

UNITED STATES PATENT OFFICE.

WILLIAM HENRY NASH, OF SAULT STE. MARIE, ONTARIO, CANADA.

HAULING ATTACHMENT FOR FORDSON TRACTORS.

Application filed January 4, 1926. Serial No. 79,148.

My invention relates to an attachment for the Fordson tractor, which attachment provides for the draft on the tractor being inserted thereon from beneath the casing of the rear axle with extended draw-bar and improved method for turning. And the objects of my invention are:—

1stly.—To provide for the draft on the Fordson tractor being inserted from beneath the rear axle of the tractor, thus holding the front end of the tractor solidly on the ground under all conditions of the surface over which the tractor passes.

2ndly.—To afford much improved facilities for making short turns with the tractor while attached to vehicles, farm implements, sleighs or any other object for the movement of which the tractor is used.

3rdly.—To provide such freedom as will permit the tractor and the vehicle or other object to which the tractor is attached to pass over uneven surfaces without the possibility of any part of the mechanism binding or breaking by reason of having bound.

4thly.—To provide a substantial and suitable attachment whereby the tractor may back up any vehicle, sleigh, or other poled object to which it may be attached and have perfect control of such vehicle, sleigh, or other poled object on any hill.

5thly.—To so utilize the tractor that the same will form or take the place of the front wheels of a truck or the front bob of a sleigh and that while the tractor is being used as such that the tractor has perfect freedom and is free from any possibility of binding under any circumstance.

6thly.—By throwing the weight of part of the load to which the tractor is attached upon the tractor itself and thus increasing its traction power.

I attain these objects by the mechanism illustrated in the accompanying drawings in which Figures 1 and 9 are vertical side sections of the entire attachment when assembled. Figure 2 is a view of the attachment, viewing it from the front end of the tractor and showing it from a plane just forward of the rear axle housing, placed on the housing of the rear axle of the tractor. Figure 3 is a top view of the attachment. Figure 4 is a top view of the plate attached to the existing draw-bar of the Fordson tractor. Figure 5 is a top view of the sleeve of the pole attachment. Figure 6 is an end view of part of the carrying beam of the attachment. Figure 7 is an end view of part of the pole attachment. Figure 8 is an end view of part of Figure 4; similar letters refer to similar parts throughout the several views.

ABCD is a metal bench, shaped so as to fit conveniently over the housing of the rear axle and gears of the tractor and having at either end thereof laterally extended lugs, in which lugs are drilled holes sufficiently large to receive the U-bolts V. The said ends ABCD are sufficiently wide as to extend out over the housing of the rear axle close to a collar on the housing of the said tractor, and curved on lower side to fit snugly on the said housing as indicated by $edc$, the bench is so extended upwards as to fit over the housing of the rear axle of the tractor and having at the top an even surface so that the metal plate IJKLMNOP may be attached thereto by the bolts $b$. RSTU is a small metal pin of sufficient size to conveniently fit into an existing hole at the top of the gear housing of the said tractor. The said bench is attached to the housing of the rear axle and gears of the Fordson tractor and held in place by two (2) U-bolts VX, one on either end of the bench and by the metal pin RSTU which fits snugly into the existing hole on the top of the housing of the gears of the said tractor.

IJKLMNOP is a metal plate of sufficient width to extend laterally over the housing of the gears of the tractor and to permit the Y end of the rod YZ$a$ to pass through the metal plate and to pass down under the housing of the rear axle outside the housing of the gears; the said plate being of sufficient length as to carry the swivel-post FFGGHHIIJJKKLLMMNNOOPPQQ sufficiently back as to clear the wheels or the crawlers of the tractor and having at the front end of the said plate two (2) holes permitting the Y end of the rod YZ$a$ to pass therethrough also having two (2) holes directly over the bench hereinbefore described through which two (2) bolts may be inserted to hold the same solidly to the bench, also two (2) holes near the rear of the plate in which the counter-sunk headed bolts VV may be placed, and also a hole through which the top FFGG of the swivel-post may pass. At the lower front end surface of the said plate is placed a metal filler extending from the place on the plate where the front edge of the bench attaches thereto to the front end of the said plate and of sufficient thickness to fit snugly on the top of the casing of the gears of the tractor, a side view of the said metal filler being shown in Figure 1 as JGFQ. The said plate IJKLMNOP is held in place, firstly by being bolted solidly to the bench hereinbefore described and in the manner described; secondly by the truss-rods YZa, and thirdly by the brace *lmnopqr* which is composed of metal of approximately the same thickness as that of the plate hereinbefore described and being shaped at either end as to fit snugly against the bottom of the said plate and also against the top of the draw-bar extension plate hereinafter described. The said brace is fastened snugly and solidly to the bottom of the said plate with two (2) counter-sunk headed bolts VVXX and to the top of the draw-bar extension plate by the two (2) bolts CCDD which extend through the said brace, through the said draw-bar extension plate and through the existing draw-bar of the Fordson tractor, thus holding all three parts solidly together.

YZa is a metal bar of sufficient length to extend from the raised part *ut* of the draw-bar extension plate along under the housing of the rear axle of the tractor and so shaped as to fit snugly partly around the said rear housing and then up through the metal filling JGFQ and through the plate

IJKLMNOP and having either end threaded so as to receive a substantial lock-washer and nut. Two of these rods are used having the ends *a* close together and having the ends Y somewhat distanced.

FFGGHHIIJJKKLLMMNNOOPPQQ is a metal post, the portion of which may be described as IIKKOOPP is square and perforated with three (3) holes SS to which the U-shaped part of the figure YY*bbaa*ZZ may be inserted and through which a bolt may be placed to hold the same stationary. The lower end of said post described as KKLLMMNN is rounded, the diameter of which is smaller than the width of the square portion, and of sufficient length to pass through the perforation in the draw-bar extension plate just in front of the portion to which the truss-rods are bolted and extending sufficiently down as to permit the same to be perforated and to receive through the perforation a cotter-pin. The upper end of the said swivel-post described as FFGGHHQQ is rounded, the diameter of which is smaller than the width of the square portion, and of sufficient length to extend up through the plate IJKLMNOP and the carrying swivel-bar *jjkkllmm* and through a washer and also of sufficient length to extend sufficiently upward as not to interfere with the action of the said carrying-swivel bar and having near the top end thereof a perforation through which a cotter-pin is placed.

*rtvxyztr* is a metal plate of the same thickness as the plate IJKLMNOP and approximately the same width as that part of the plate described as LMNO and extending from the existing draw-bar of the Fordson tractor sufficiently far back as to correspond with the extension backwards of the plate IJKLMNOP and having the rear end tapered with a large perforation therein to which to attach draft-clevises and having a further perforation MMLL which is directly under the perforation at the rear of the plate IJKLMNOP and through which the swivel-post hereinbefore described is inserted. The said plate has also a raised bracket *stu* of sufficient height and convenient perforations as to receive the truss-rods YZa and having at its front end at least two (2) perforations through which the bolts CC may pass to securely fasten the said plate to the existing draw-bar of the Fordson tractor.

*jjkkllmm* is a swivel carrying bar rounded with the end *mmjj* flattened out to be about double the width of the bar and having near the front or flattened end thereof an oval-shaped perforation *ww* through which oval-shaped perforation the top of the swivel-post hereinbefore described may pass and may move backwards and forwards and thus avoid binding or passing over rough or uneven ground and is held in place at the front end by the washer TTUU and the cotter-pin through the top of the said swivel-post. The said swivel-carrying beam having at the rear end a perforation through which a cotter-pin ZZ may pass and holding the washer *nnoo*.

*rrssttuuppqq* is a steel casting having a sufficient opening through which the carrying-beam of a two-wheeled trailer or one-bob trailer may pass, the said steel casting having two (2) perforations in either side through which two (2) bolts may pass holding the said carrying-beam of the trailer or sleigh solidly in place, the metal casting being held on the carrying-beam *jjkkllmm* by two (2) metal lugs which are part of the casting and through which lugs perforations are made sufficiently large for the said carrying-beam to pass and to permit the said carrying-beam to have free action backwards and forwards therethrough, the said casting being such that it may be used either on top of the carrying-beam or on the bottom of the same according to requirements, thus making it interchangeable for wheels or runners.

YYZZ*aabb* is a metal sleeve having at the YY end thereof a clevis-shaped device sufficiently wide to fit over the square sides of the said swivel-post

FFGGHHIIJJKKLLMMNNOOPPQQ and being perforated at either side of the said clevis-shaped device so that a bolt may pass therethrough and through the perforations SS in the swivel-post. The said sleeve is of sufficient size to admit the round end of the casting *ccddeehhggff* until the rear part of the sleeve will fit up against the square shoulders of the said casting at the point *ffee*, this permits the round end of the said casting *ccddeehhggff* to move backwards and forwards in the said sleeve and also to rotate from side to side. *ccddeehhggff* is a metal casting rounded on the front end so as to fit into the sleeve YYZZ*aabb* and to permit it to move backwards and forwards in the said sleeve and to permit it to rotate from side to side therein. The rear end of said casting is rectangular in shape and of sufficient size to fit over the end of the tongue of a vehicle, sleigh or other implement to which the tractor may be attached and is perforated by two (2) holes on either side through which bolts may pass to hold the tongue solidly to the rectangular casting, thus permitting the tractor by means of the sleeve and casting to shove back or to direct the course of the vehicle or other object which is being hauled by the tractor.

For the better understanding of the workings of this which I claim as my invention, the element YY—ZZ—*aa*—*bb* together with its complemental element

*cc*—*dd*—*ee*—*hh*—*gg*—*ff* is a component part of my entire invention and is necessary in using the invention under all circumstances for the purpose of directing the course of the vehicle and in pushing back the vehicle or sleigh to which the tractor is attached. As pointed out, the tongue of the vehicle or sleigh which the tractor is hauling is securely fastened to the element *cc*—*dd*—*ee*—*hh*—*gg*—*ff*. This element does not bear any weight but is used entirely for directing the course of the vehicle or sleigh, and in backing up. The element *jj*—*kk*—*ll*—*mm*, the swivel carrying bar aforementioned, is to be in use only in such instances when the tractor forms one of the burden bearing elements of the equipment, as for example, in the case of a one-bobbed sleigh at which time the beam of the trailer is fastened into the element *rr*—*ss*—*qq*—*uu*. When the four-wheeled trailer or two-bobbed sleigh is being hauled by the tractor, the weight of the load is entirely on the wheels or the runners in which case the said carrying beam is not used and may be removed from the attachment. In all cases the main draft is at *v*—*x*—*y*—*z*.

I am aware that prior to this, my invention, other ideas similar to the element *yy*—*zz*—*aa*—*bb*—*yy* and its complemental element have been put forward, but in those cases, the element has been used as the draft bearing element in the invention. I therefore do not claim such idea broadly, but What I do claim as my invention and desire to secure by Letters Patent is:—

1. The combination in a hauling attachment for the Fordson tractor, comprised of a metal bench with extended perforated lugs and metal pin, large metal plate with perforations, metal draw-bar extension plate with raised perforated portion, a brace bent at either end, two metal truss-rods with threaded ends, with metal swivel-post duly perforated, metal swivel carrying-beam flattened and perforated, metal casting, hollowed and perforated and with perforated lugs, metal sleeve with clevised ends and metal casting moving within the sleeve and hollowed and perforated, all substantially as described.

2. In a hauling attachment for the Fordson tractor the frame-work comprised of a metal bench with extended perforated lugs and metal pin, large metal plate with perforations, metal draw-bar extension plate with raised perforated portion, a brace bent at either end and two metal truss-rods with threaded ends with metal swivel post duly perforated, all substantially as described.

Dated at Sault Ste. Marie, Ontario, this 31st day of December A. D. 1925.

WILLIAM HENRY NASH.